US011416786B2

(12) United States Patent
Helsel et al.

(10) Patent No.: US 11,416,786 B2
(45) Date of Patent: Aug. 16, 2022

(54) LEARNING POWER GRID CHARACTERISTICS TO ANTICIPATE LOAD

(71) Applicant: Microsoft Technology Licensing, LLC, Redmond, WA (US)

(72) Inventors: Michael Rees Helsel, Seattle, WA (US); Vincent Joseph Blas, Edmonds, WA (US); Nicholas Andrew Keehn, Kirkland, WA (US); Sean Michael James, Olympia, WA (US); Brandon Middaugh, Redmond, WA (US)

(73) Assignee: Microsoft Technology Licesning, LLC, Redmond, WA (US)

( * ) Notice: Subject to any disclaimer, the term of this patent is extended or adjusted under 35 U.S.C. 154(b) by 9 days.

(21) Appl. No.: 16/843,221

(22) Filed: Apr. 8, 2020

(65) Prior Publication Data
US 2020/0234202 A1    Jul. 23, 2020

Related U.S. Application Data

(63) Continuation of application No. 15/948,750, filed on Apr. 9, 2018, now Pat. No. 10,628,762.

(51) Int. Cl.
*G05B 15/02* (2006.01)
*G06Q 10/04* (2012.01)
(Continued)

(52) U.S. Cl.
CPC ............. *G06Q 10/04* (2013.01); *G05B 15/02* (2013.01); *G05F 1/66* (2013.01);
(Continued)

(58) Field of Classification Search
None
See application file for complete search history.

(56) References Cited

U.S. PATENT DOCUMENTS 10,628,762 B2 * 4/2020 Helsel ................ G05B 15/02
2007/0260417 A1 * 11/2007 Starmer .............. G01K 17/00
702/136
(Continued)

OTHER PUBLICATIONS

"International Search Report and Written Opinion Issued in PCT Application No. PCT/US2019/021720", dated May 28, 2019, 13 Pages.
(Continued)

*Primary Examiner* — Ryan A Jarrett
(74) *Attorney, Agent, or Firm* — Workman Nydegger

(57) ABSTRACT

Improving the operations of a computer system that is located within a power grid and that is associated with its own power sources. Past operational characteristics of the power grid are analyzed to derive learned characteristics for the power grid. Future operational characteristics of the power grid are also monitored. A prediction regarding a future load event associated with the power grid is then generated using the learned characteristics and the monitored characteristics. In response to this prediction, one or more operations are performed to balance the computer system with the power grid during the future load event, and to ensure a determined availability of services associated with the computer system during the future load event.

19 Claims, 10 Drawing Sheets

(51) Int. Cl.
  *G05F 1/66*   (2006.01)
  *G06Q 30/02*  (2012.01)
  *G06Q 50/06*  (2012.01)
  *G06Q 10/06*  (2012.01)
(52) U.S. Cl.
  CPC ... *G06Q 10/06312* (2013.01); *G06Q 30/0202* (2013.01); *G06Q 50/06* (2013.01)

(56) References Cited

U.S. PATENT DOCUMENTS

| | | | | |
|---|---|---|---|---|
| 2009/0113049 | A1* | 4/2009 | Nasle | G05B 19/0428 709/224 |
| 2011/0239010 | A1* | 9/2011 | Jain | G06F 1/3209 713/310 |
| 2012/0109705 | A1* | 5/2012 | Belady | G06F 9/5094 705/37 |
| 2013/0086404 | A1* | 4/2013 | Sankar | G06F 1/305 713/320 |
| 2014/0358309 | A1* | 12/2014 | Arya | G06Q 50/06 700/295 |
| 2018/0157563 | A1* | 6/2018 | Bryant | G06F 11/3062 |
| 2019/0058330 | A1* | 2/2019 | Kobayashi | H02J 3/008 |

OTHER PUBLICATIONS

"Office Action Issued in European Patent Application No. 19714271.4", dated Dec. 21, 2021, 10 Pages.

* cited by examiner

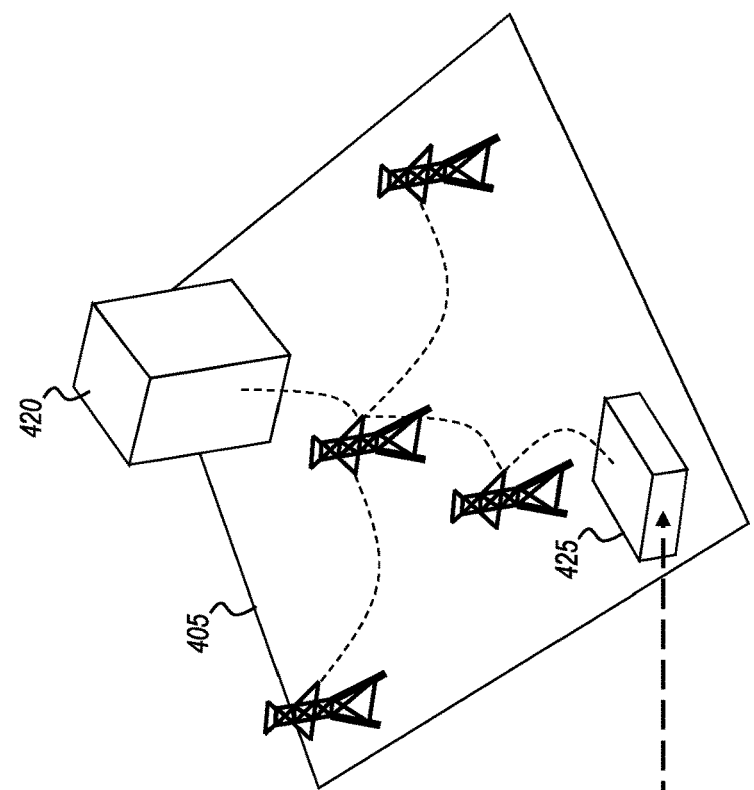
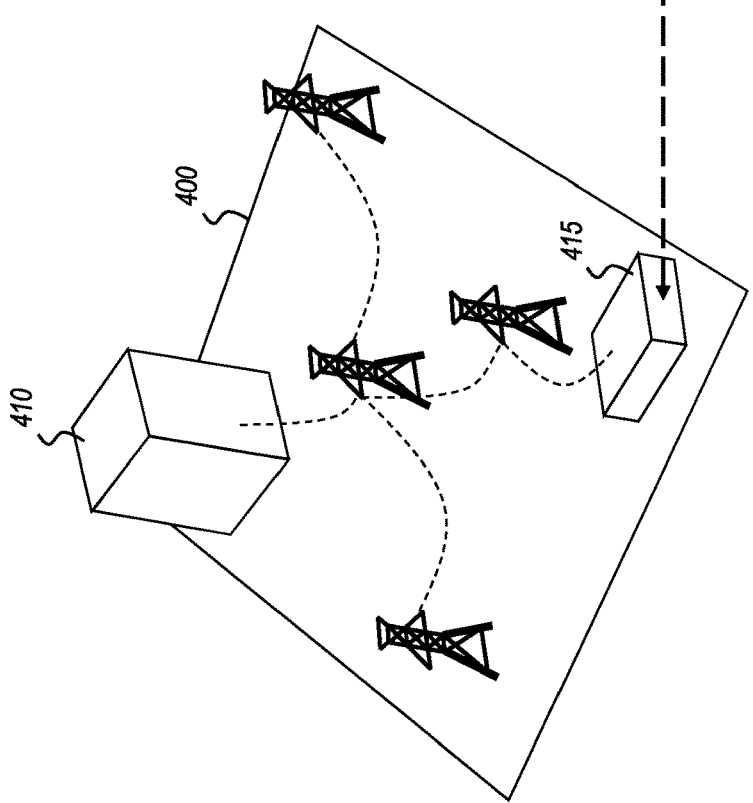
FIG. 4

LEARNING POWER GRID CHARACTERISTICS TO ANTICIPATE LOAD

CROSS REFERENCE TO RELATED APPLICATIONS

This application is a continuation of U.S. patent application Ser. No. 15/948,750, filed Apr. 9, 2018, and titled "LEARNING POWER GRID CHARACTERISTICS TO ANTICIPATE LOAD," and which will issue on Apr. 21, 2020 as U.S. Pat. No. 10,628,762, the entire contents of which are incorporated by reference herein in their entirety.

BACKGROUND

A data center is a centralized facility that houses a large amount of computing hardware and other infrastructure for an information technology (IT) organization. When reference is made to storing data in the "cloud," the data is actually being stored and managed by one or more of these data centers.

Data centers are typically large facilities that include all of the infrastructure and hardware needed to provide reliable, specialized services to their clients. Examples of some of these services include data storage, software as a service (SAAS), platform as a service (PAAS), and infrastructure as a service (IAAS), which are typically provided by a data center's servers. Because servers generate a large amount of heat when they operate, most data centers also include full-scale HVAC systems to control their climate conditions. The data center, including its hardware and infrastructure, are usually connected to and powered by at least one power grid. Although they are connected to a power grid, most data centers also have their own power backups which are used to ensure that their hardware and infrastructure are always adequately powered. Sometimes there is an immediate surplus of power available in the power grid, while in other instances there is an immediate shortage of power.

The subject matter claimed herein is not limited to embodiments that solve any disadvantages or that operate only in environments such as those described above. Rather, this background is provided only to illustrate one exemplary technology area where some embodiments described herein may be practiced.

BRIEF SUMMARY

At least some of the embodiments disclosed herein relate to operating an architecture that improves the operations of a data center located within a particular power grid. While the data center may at times be powered by the power grid, it may also be powered using its own power sources that are independent of the power grid. As such, the data center is not only able to consume power from the power grid, but it is also able to provide power back to the power grid using its own power sources. In this manner, the data center is able to provide ancillary services for the power grid.

Because load on a power grid will often fluctuate a great deal (potentially causing supply voltage fluctuations), it is beneficial to utilize machine learning to learn the operational characteristics of that power grid. The data center will not only be able to better manage its own resources (e.g., during times of power grid fluctuations), but the data center will also be able to provide better ancillary services to the power grid. As such, various different past operational characteristics of the power grid are analyzed in order to derive, through machine learning, learned characteristics for that power grid. In addition to learning the past characteristics, the current operational characteristics of the power grid are also monitored. Future events that are already scheduled to occur may also be included in this analysis. It is beneficial to learn the past, the current, and the possible future grid characteristics because load on the power grid may change drastically in just a few milliseconds.

Thereafter, the learned characteristics and the current (and/or future) characteristics are used to generate a prediction regarding an upcoming, anticipated load for the power grid. In response to this prediction, various different mitigation operations are then performed at the data center. These mitigation operations are performed to ensure that any services provided by the data center will be adequately available for the data center's users. Examples of these mitigation operations include, but are not limited to, causing the data center to consume more power, causing the data center's power sources to store more power, or even migrating services from the data center to a different data center that is located in a different power grid.

In this manner, significant advantages are realized because the embodiments improve the overall efficiency of the power grid and the data center. In particular, the embodiments help balance out the power grid so that the power grid becomes more reliable and robust overall, and they also promote efficiencies in the data center itself.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosed embodiments may be realized and obtained by means of the instruments and combinations particularly pointed out in the appended claims. Features of the disclosed embodiments will become more fully apparent from the following description and appended claims or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates how one data center may communicate with another data center that is located within a different power grid.

DETAILED DESCRIPTION

Figure 1:
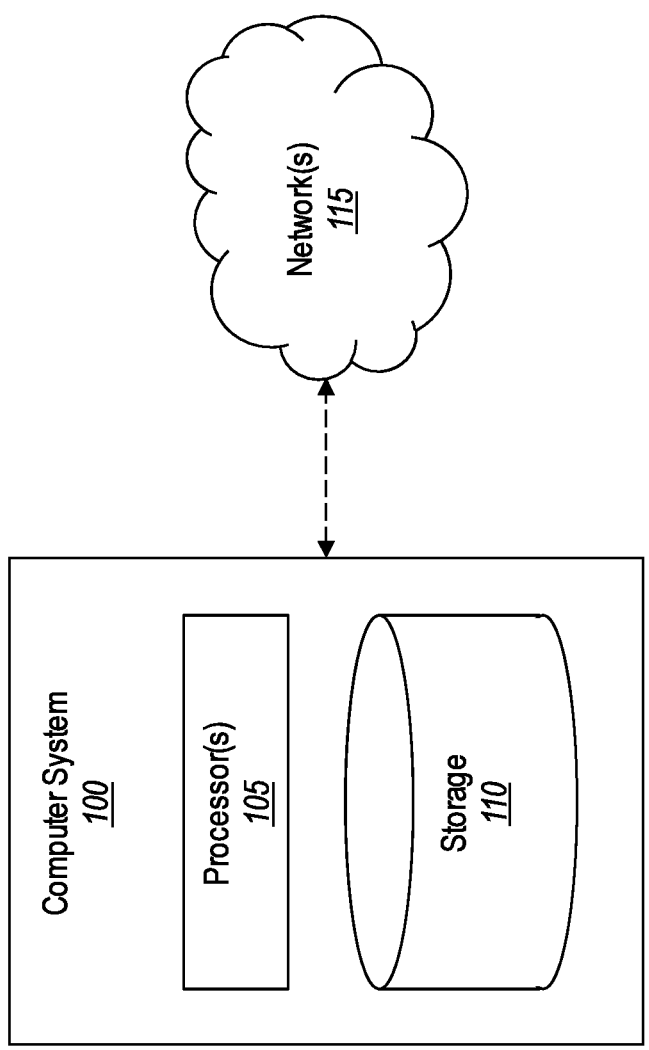
FIG. 1 illustrates an example computer system that may be used to perform the disclosed operations.

At least some of the embodiments disclosed herein relate to operating an architecture that improves the operations of a data center located within a particular power grid. While the data center may at times be powered by the power grid, it may also be powered using its own power sources that are independent of the power grid. As such, the data center is not only able to consume power from the power grid, but it is also able to provide power back to the power grid using its own power sources. In this manner, the data center is able to provide ancillary services for the power grid.

Because load on a power grid will often fluctuate a great deal (potentially causing supply voltage fluctuations), it is beneficial to utilize machine learning to learn the operational characteristics of that power grid. The data center will not only be able to better manage its own resources (e.g., during times of power grid fluctuations), but the data center will also be able to provide better ancillary services to the power grid. As such, various different past operational characteristics of the power grid are analyzed in order to derive, through machine learning, learned characteristics for that power grid. In addition to learning the past characteristics, the current operational characteristics of the power grid are also monitored. Future events that are already scheduled to occur may also be included in this analysis. It is beneficial to learn the past, the current, and the possible future grid characteristics because the power grid may change drastically in just a few milliseconds.

Thereafter, the learned characteristics and the current (and/or future) characteristics are used to generate a prediction regarding an upcoming, anticipated load for the power grid. In response to this prediction, various different mitigation operations are then performed at the data center. These mitigation operations are performed to ensure that any services provided by the data center will be adequately available for the data center's users. Examples of these mitigation operations include, but are not limited to, causing the data center to consume more power, causing the data center's power sources to store more power, or even migrating services from the data center to a different data center that is located in a different power grid.

In this manner, significant advantages are realized because the embodiments improve the overall efficiency of the power grid and the data center. In particular, the embodiments help balance out the power grid so that the power grid becomes more reliable and robust overall, and they also promote efficiencies in the data center itself.

Example Technical Benefits

The disclosed embodiments provide significant advantages over traditional data center resource utilization technologies. As an initial matter, the disclosed embodiments directly improve the operations and balancing of power grids, thereby making those power grids more reliable and robust.

By way of example, because the load on a power grid will often fluctuate a great deal, the voltage supplied by the power grid may also fluctuate. In some circumstances, a power grid may have a large surplus of electricity while in other circumstances that same power grid may have a large shortage of electricity. By configuring a data center according to the disclosed principles, significant advantages are realized because the data center is able to help even out the fluctuating voltage peaks and valleys that occur on the power grid. Specifically, during times of surplus, the data center is able to perform operations to reduce that surplus. During times of shortage, the data center is able to perform augmenting operations to lessen the impact of the shortage. In this manner, the embodiments provide valuable and highly needed balancing effects for the power grid.

An example will be helpful. Consider a scenario where the power grid is powered using a renewable energy power plant, such as a wind turbine farm. Sometimes, the environmental conditions will cause the wind turbines to spin very fast and thus produce an excess amount of electricity. This excess may cause an undesired peak of electricity in the power grid. Therefore, it may be desirable to offload this excess of electricity in some manner. By following the disclosed principles, the embodiments are able to beneficially reduce the impact of these peaks by consuming more electricity in a predetermined manner.

At other times, the environmental conditions may result in little to no wind, thus causing the wind turbines to produce little to no electricity. Consequently, there is an electricity shortage in the power grid. When faced with such a condition, the embodiments beneficially provide ancillary services to help balance this shortage. As used herein, "ancillary services" generally refers to the process of selling (and thereby providing) electricity to the power grid. Because the data center can harvest its own electricity (e.g., from battery backups, generators, fuel cells, etc.), the data center is able to provide such ancillary services when needed or desired. In this manner, the embodiments provide great improvements by helping to balance the power grid.

Other advantages are realized because the embodiments are able to perform machine learning to predict when these fluctuations will occur. As an example, suppose a major electricity consumer (e.g., a large research and development institution), which is located in the same power grid as a particular data center, follows a pattern in its electricity consumption activities. By applying machine learning to learn the traits and characteristics of the power grid, which include the traits and characteristics of the consumer, a prediction can be made regarding when electricity surpluses and shortages will occur. In some instances, these fluctuations may occur extremely quickly (e.g., in just a few milliseconds). As such, it is particularly beneficial to predict when they will occur beforehand to enable the datacenter to adequately prepare its resources. These predictions may be generated using past operational data, current operational data, and even data based on events scheduled to occur in the future.

Other advantages include the ability to dynamically offload services and data to another data center based on the prediction. For example, if the prediction determines that a major event will shortly transpire (e.g., a political event, social event, environmental event, etc.), then the services and data at the data center can be offloaded to another data center to ensure the integrity and safety of that data. Accordingly, the embodiments provide significant improvements and benefits over traditional technologies.

Figure 6:
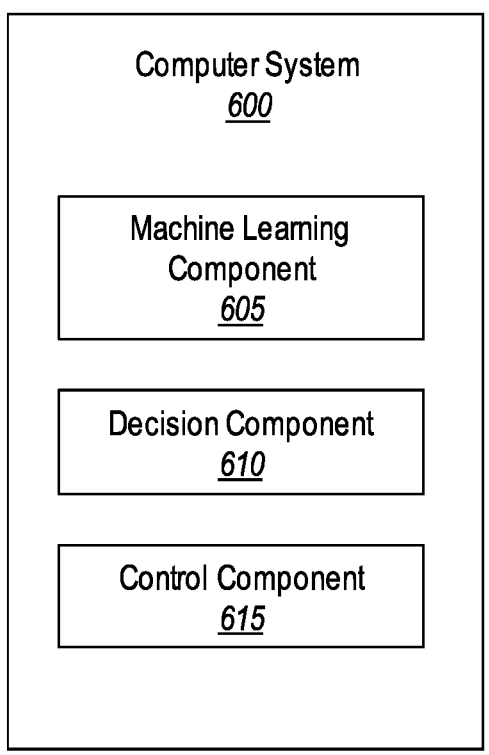
FIG. 6 illustrates an example computer system specially configured to improve how data centers operate by predicting fluctuations that occur within a power grid and by dynamically adjusting their operations in response to this prediction to better plan resource utilization.
Figure 7:
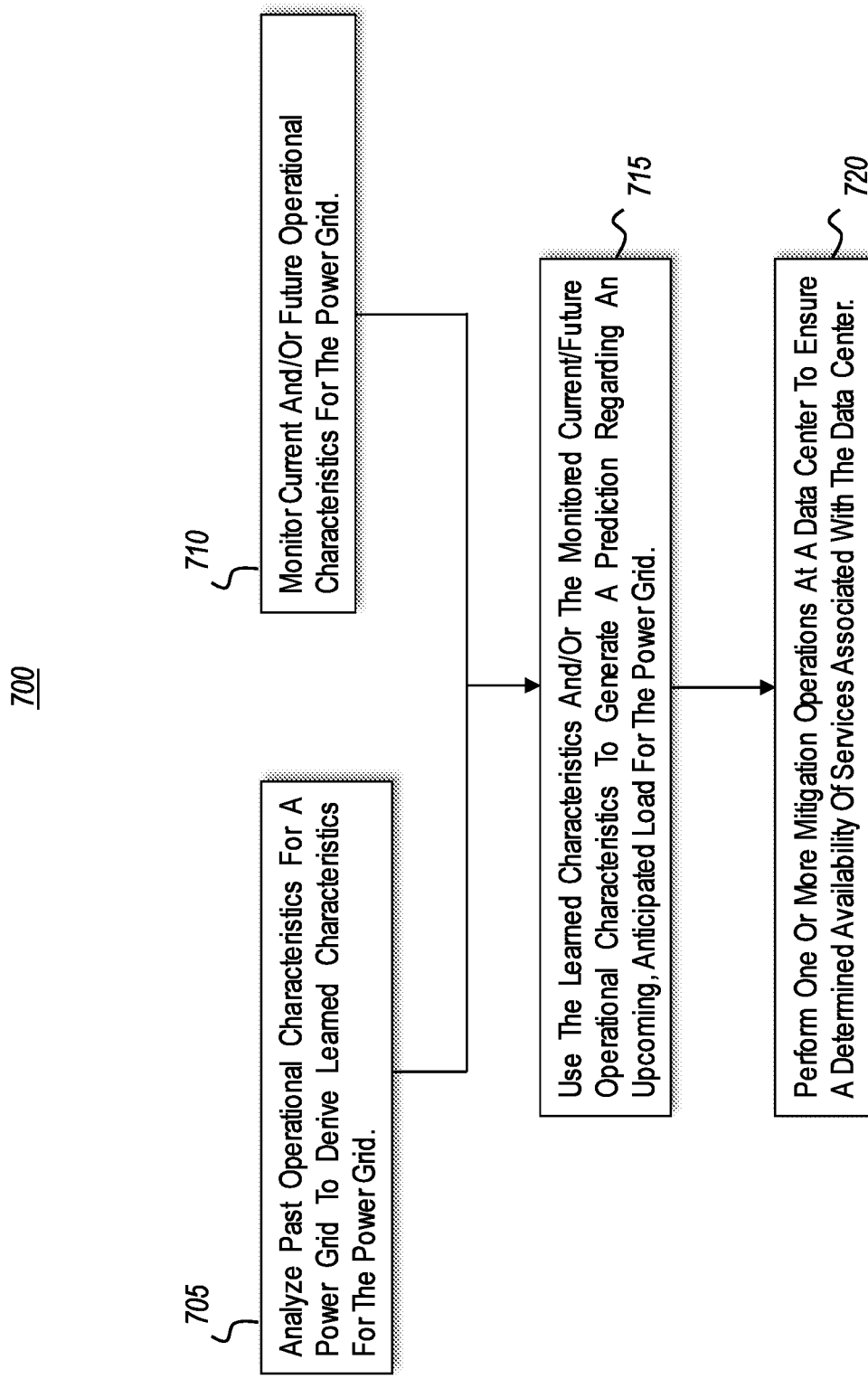
FIG. 7 shows an example method for improving the operations of a data center in the manner described above.

Having just described some of the features and benefits at a high level, attention will now be directed to FIG. 1 which illustrates an example computer system that may be used to perform the disclosed operations. Following that disclosure, attention will be directed to FIGS. 2 through 5 which provide various supporting illustrations on data centers and power grids. FIGS. 6 and 7 will then be presented. These figures illustrate an example computer system and a method that may be performed by the computer system to improve the operations of the data center. Finally, FIGS. 8 through 10 will be discussed. These figures illustrate some of the conditions and metrics that are involved in generating a prediction regarding an upcoming load of the power grid as well as some of the operations that may be performed in response to that prediction.

Example Computer System

Attention will now be directed to FIG. 1 which illustrates an example computer system 100 that may be used to facilitate the operations described herein. The computer system 100 may take various different forms. For example, the computer system 100 may be embodied as a distributed system that includes one or more connected computing components/devices that are in communication with the computer system. It may also be embodied as a desktop computer, a laptop, a tablet, a mobile phone, server, data center and/or any other computer system. In its most basic configuration, the computer system 100 includes at least one hardware processing unit 105 (aka a "processor 105") and storage 110.

The storage 110 may be physical system memory, which may be volatile, non-volatile, or some combination of the two. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g. as separate threads).

The disclosed embodiments may comprise or utilize a special-purpose or general-purpose computer including computer hardware, such as, for example, one or more processors (such the hardware processing unit 105) and system memory (such as storage 110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors. Further, the computer system 100 may also be connected through one or more wired or wireless networks 115 to remote systems(s) that are configured to perform any of the processing described with regard to computer system 100.

A "network," like the network 115 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 115. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 105). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

Data Centers

Figure 2:
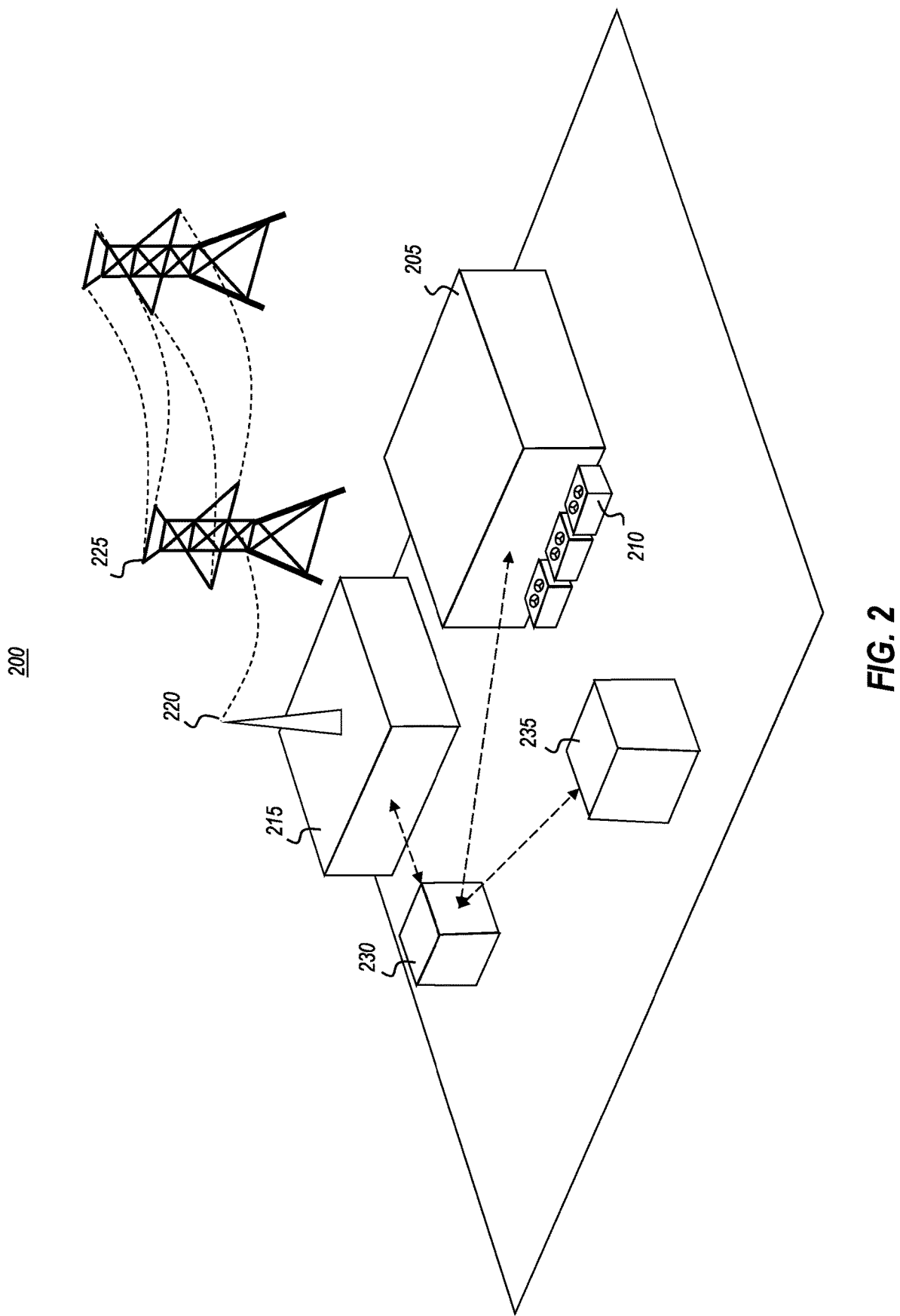
FIG. 2 shows an example data center facility that includes a site substation, a transformer, a generator, and a centralized facility that houses computing hardware.

FIG. 2 illustrates a data center complex 200 that includes a data center 205, an environmental control infrastructure 210, a site substation 215, a connection 220 to a power grid 225, a transformer substation 230, and a generator station 235. The data center 205 may include any number of servers or other types of computing devices configured in a manner similar to the computer system 100 of FIG. 1. As an example, the computer system 100 may be a server running in the data center 205.

The data center 205 may include any number of servers organized with a server rack. Further, the data center 205 may include any number of these server racks (e.g., hundreds or even thousands of different server racks resulting in hundreds or thousands of different servers). A server is able to provide computing resources or services to any number of clients. For instance, instead of storing data locally within their enterprises, many clients desire to store their data at a data center. Additionally, many clients elect to use SAAS services, PAAS services, and/or IAAS services, each of which is provided by the servers in a data center. Accordingly, the data center 205 is able to provide for any type of computing need.

The environmental control infrastructure 210 includes any type of infrastructure useful in controlling the climate conditions of the data center 205. As examples only, the environmental control infrastructure 210 may include a full-scale heating, ventilation, and air conditioning (HVAC) system. Such a system includes any number of humidifiers, dehumidifiers, fans, cooling stations, furnaces, evaporator coils, vents, condensing units, and so forth, along with any supporting infrastructure associated with those components.

Controlling the climate of the data center 205 is beneficial because servers produce a large amount of heat. If the temperature within the data center 205 was left unchecked, then there may be catastrophic damage to the servers because of this heat. As such, it is beneficial to keep the data center 205 at a predetermined climate to help reduce the likelihood of system failure resulting from high temperatures. Along with the servers, the environmental control infrastructure 210 is also a major consumer of electricity.

The site substation 215 receives incoming electricity from the power grid 225 and manages how that electricity will be distributed (e.g., to the environmental control infrastructure 210, to the data center 205, etc.). The transformer substation 230 is able to transform the incoming electricity into a form that is optimal for any kind of electricity consuming entity in the data center complex 200 (e.g., the servers in the data center 205, the compressors in the HVAC, the lights in the buildings, the fans, etc.).

The generator station 235 is a power source that is able to generate power independently of the power grid 225. As one example, the generator station 235 may include one or more fuel cells (i.e. a cell that uses a chemical reaction to produce electricity). A hydrogen fuel cell is able to produce electricity by combining hydrogen and oxygen in a chemical reaction to produce electricity, heat, and water. So long as there is an adequate supply of hydrogen, then the fuel cell will be able to continue to produce electricity.

The generator station 235 may include other types of electricity producing devices. For example, the generator station 235 may include solar panel arrays, generators (e.g., gas, diesel, kerosene, natural gas, etc.), wind turbines, pumped storage, or any other type of device that produces electricity.

In addition to producing electricity, the generator station 235 may also include devices to store electricity. For instance, the generator station 235 may include any number of batteries, capacitors, powerpacks, or any other type of device that is able to store electricity for a determined period of time. As will be described in more detail later, the data center complex 200 (and in particular the generator station 235) is connected to the power grid 225 via connection 220. With this configuration, the data center complex 200 is able to both consumer electricity from the power grid 225 as well as provide electricity to the power grid 225.

Although the data center 205, the environmental control infrastructure 210, the site substation 215, the transformer substation 230, and the generator station 235 are shown as separate structures, they may also be included within a single structure or any number of structures. Accordingly, the scenario shown in FIG. 2 is for example purposes only and thus non-limiting.

Figure 3:
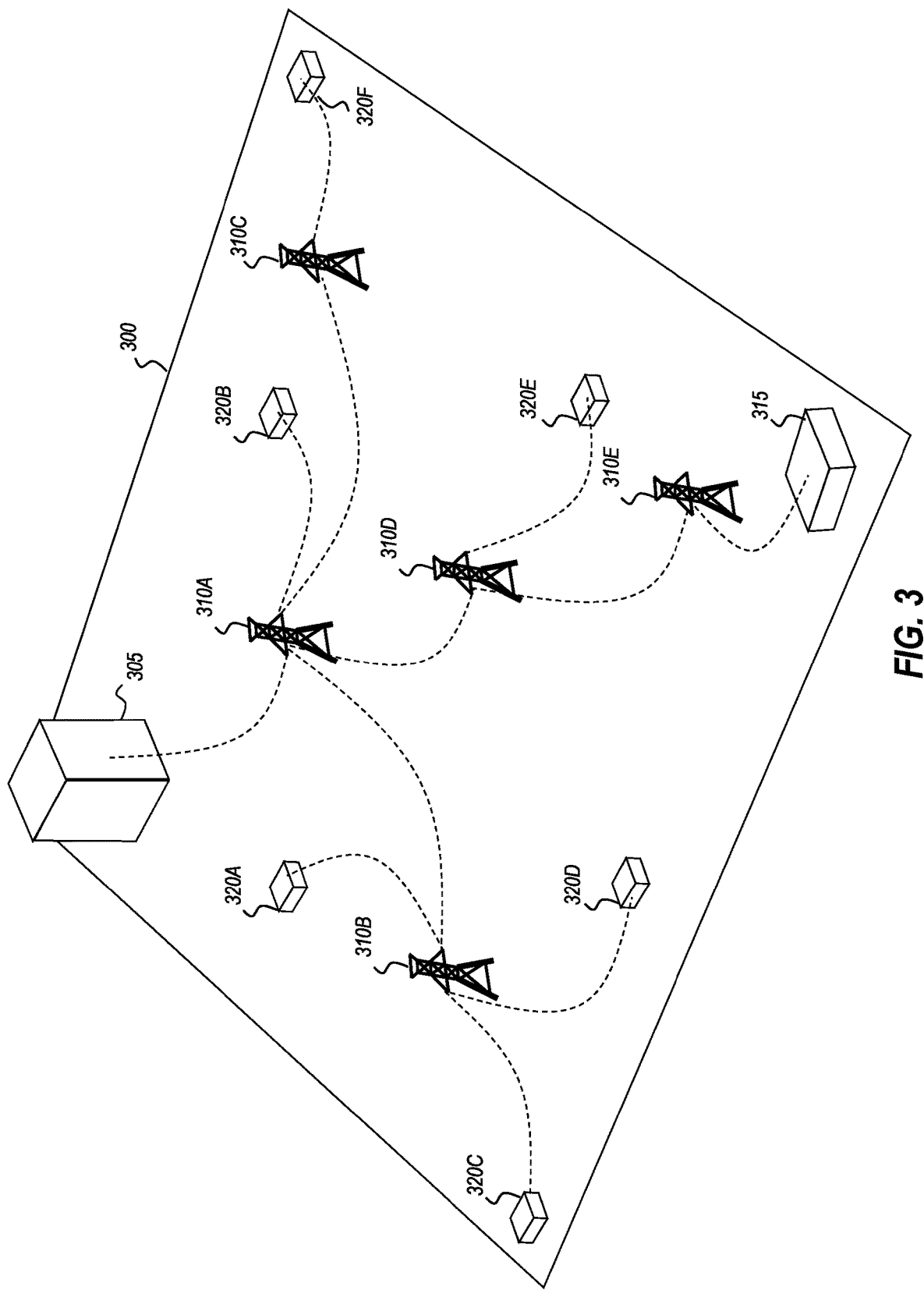
FIG. 3 shows a power grid that includes a power station, multiple customer facilities using the power from the power station, and a data center.

FIG. 3 shows an overall power grid 300 which is an example implementation of the power grid 225 from FIG. 2. The power grid 300 includes a power station 305 that is structured to provide electricity to any facilities (or other electricity consuming entities or devices) located within the power grid 300. The power station 305 may be any type of power station. As examples only, the power station 305 may be a wind turbine station, a coal powerplant, a natural gas powerplant, a hydroelectric dam, a nuclear powerplant, a solar powerplant, a geothermal powerplant, a petroleum powerplant, a chemical energy powerplant, or any other type of powerplant, or combinations of the above.

The electricity produced by the power station 305 is routed throughout the power grid 300 via any known manner. As an example, the cable towers 310A, 310B, 310C, 310D, and 310E are able to route electricity (via electrified transmission lines) throughout any area in the power grid 300.

As discussed above, this electricity may be routed to any number of electricity consumers, such as for example, a data center 315 (which is an example representation of the data center complex 200 from FIG. 2), and other facilities 320A, 320B, 320C, 320D, 320E, and 320F. Facilities 320A-F may be any type of facility (or entity or device) that consumes electricity. Examples include, but are not limited to, homes, business buildings, office complexes, warehouses, research facilities, airports, military bases, billboards, signs, and so on. Accordingly, the power station 305 is able to provide electricity to a geographic region that includes any number and any type of electricity consumers. Furthermore, facilities 320A-F may have different electricity needs at different times. As such, they place varying loads on the power station 305. These varying loads cause fluctuations in the power grid 300.

Fluctuations occur in the power grid 300 in response to many different events, such as, for example, political events (e.g., an election), social events (e.g., a large sporting event like the Super Bowl), natural disasters (e.g., a hurricane or earthquake), or any other event. Additional strain may be placed on the power grid 300 because an increased number of consumers are drawing power from the power station 305. Similarly, when those events are over, then a surplus of electricity may occur until the power grid 300 balances out. Accordingly, FIG. 3 provides an example illustration of a power grid 300 and how that power grid 300 may fluctuate.

Attention will now be directed to FIG. 4 which shows two different power grids, namely power grid 400 and power grid 405. Power grids 400 and 405 are example implementations of the power grid 300 from FIG. 3. To illustrate, power grid 400 includes a power station 410 and a data center 415. Similarly, power grid 405 includes a power station 420 and a data center 425. Power station 410 primarily provides electricity to the power grid 400 while power station 420 primarily provides electricity to the power grid 405. In some instances, electricity from power grid 400 may be provided to the power grid 405 (e.g., in situations where the power grids 400 and 405 are relatively close to each geographically) while in other instances the two power grids 400 and 405 are completely isolated from one another.

Regardless of whether the power grids 400 and 405 share electricity, FIG. 4 shows that the data center 415 is able to communicate with the data center 425 via connection 430. This connection 430 may be any type of connection, including, but not limited to, a wired connection or a wireless connection (e.g., a radio connection).

Because of this connection 430, the data centers 415 and 425 are able to transmit data back and forth with one another. This data may include any type of data. For instance, the data may include diagnostic data regarding how each data center is operating. The data may include bandwidth data to inform its counterpart that it is able to take on more computing tasks. The data may include information about each data center's respective power grid and whether that power grid is reliable or not.

The data centers 415 and 425 are also able to transmit service and data requests back and forth. For instance, the data center 415 may be operating a SAAS, PAAS, or IAAS application for a particular client. If an event occurs that begins to limit the data center 415's ability to provide that data or service, then the data center 415 can communicate with data center 425 to seek assistance in providing those services. In this manner, services and/or data can be migrated from data center 415 to data center 425, and vice versa. Such functionalities provide backup services and ensure that client requests are adequately managed, regardless of any circumstances that are occurring in connection with any one particular data center (e.g., perhaps there is an earthquake near one data center, the other data center can still provide the requested services as needed).

Figure 5:
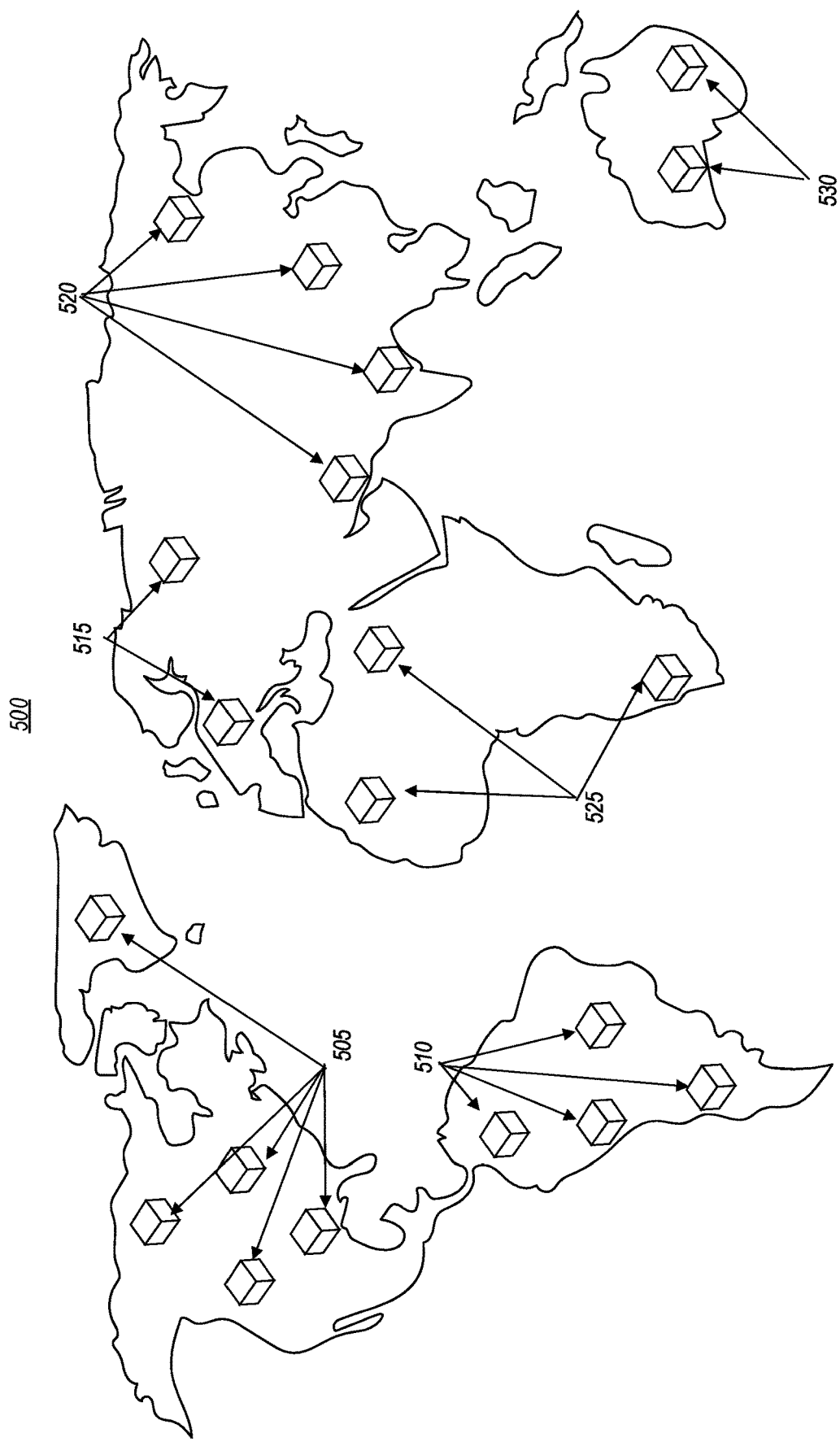
FIG. 5 demonstrates that data centers may be located all over the world and that these data centers may communicate with one another.

With that said, attention will now be directed to FIG. 5 which shows a world view 500 where many data centers are located across many different regions of the globe. This scenario is a broader representative of the narrow scenario shown in FIG. 4. As such, any number of the data centers in FIG. 5 are able to communicate with one another and are able to pass services and/or data back and forth.

FIG. 5 shows that North America includes a set of data centers 505. South America includes its own set of data centers 510. Europe includes its own set of data centers 515. Asia includes its own set of data centers 520. Africa has its own set of data centers 525. Finally, Australia has its own set of data centers 530. Although not shown, it is possible that *Antarctica* or space may have its own set of data centers. It will be appreciated that any number of these servers are able to communicate with each other and pass information and services back and forth. Furthermore, it will be appreciated that a data center in North America will probably be on a different power grid than a data center in Australia. As such, the fluctuations in a particular power grid in North America may not influence a power grid in another region.

Example Systems and Methods for Improving Data Center Operations

Attention will now be directed to FIG. 6 which shows an example computer system 600 that is configured to perform the operations disclosed herein. For reference, the computer system 600 may be an example implementation of the computer system 100 from FIG. 1.

As shown, computer system 600 includes a machine learning component 605, a decision component 610, and a control component 615. The functionalities of these components will be discussed below in connection with FIG. 7.

With that said, the following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 7 shows an example method 700 that may be performed to improve the operations of a data center. Method 700 may be performed by the computer system 600 from FIG. 6. Some of the method acts are shown side by side to each other. Such positions were selected to emphasize that there are no temporal dependencies between these method acts. As such, they may occur in parallel, sequentially, or at any time in relation to one another.

Initially, method 700 includes an act (act 705) of analyzing the past operational characteristics for a power grid, such as for example the power grid 300 from FIG. 3. As discussed previously, the power grid includes a data center. Further, the data center includes one or more power sources, which were described earlier and which are structured to provide power to the data center independently of the power grid as needed. Analyzing the past operational characteristics may be performed by the machine learning component 605 from FIG. 6. In this manner, the machine learning component 605 is able to learn about the past operational characteristics in order to derive learned characteristics for the power grid. Deriving these learned characteristics is beneficial because past behaviors often influence future behaviors. As such, knowing how the power grid operated in the past will help the machine learning component 605 predict how the power grid will likely operate in the future.

In some embodiments, the machine learning component 605 may be a neural network (e.g., a convolutional neural network). In some embodiments, the machine learning component 605 is a form of artificial intelligence. In some embodiments, the machine learning component 605 is a deep learning mechanism. Regardless of how it is configured, the machine learning component 605 is able to collect, synthesize, and analyze the past operational characteristics of the power grid (and any number of data centers) and to derive learned characteristics about the power grid and/or the data center from those operational characteristics. Further detail on these operational characteristics will be provided momentarily in connection with FIG. 8.

Method 700 also includes an act (act 710) of monitoring the current and/or any scheduled (i.e. future or upcoming) operational characteristics for the power grid. Similar to the above act, this act may also be performed by the machine learning component 605. Accordingly, the machine learning component 605 is able to draw from the past experiences of the power grid (and data center), the most recent/instant experiences of the power grid (and data center), and the scheduled upcoming experiences of the power grid (and data center).

Subsequently, the learned characteristics and/or the monitored current/future operational characteristics are used to generate a prediction regarding an upcoming, anticipated load for the power grid (act 715). This act may also be performed by the machine learning component 605. By deriving the learned characteristics of the power grid, the computer system 600 is able to predict, with a certain level of confidence, how the power grid will behave in the near and/or far future. By making this prediction, the data center will be able to help balance the power grid because the data center will be able to better manage its own resources in order to consume more or less electricity during times of need (i.e. perform "mitigation operations").

In response to the prediction, one or more mitigation operations are developed, committed to, and then executed at the data center (act 720). These mitigation operations are performed to ensure that the services provided by the data center are adequately made available. Deciding which mitigation operations to execute may be performed by the decision component 610, and implementing the selected mitigation operations may be performed by the control component 615.

Example Operational Characteristics

Figure 8:
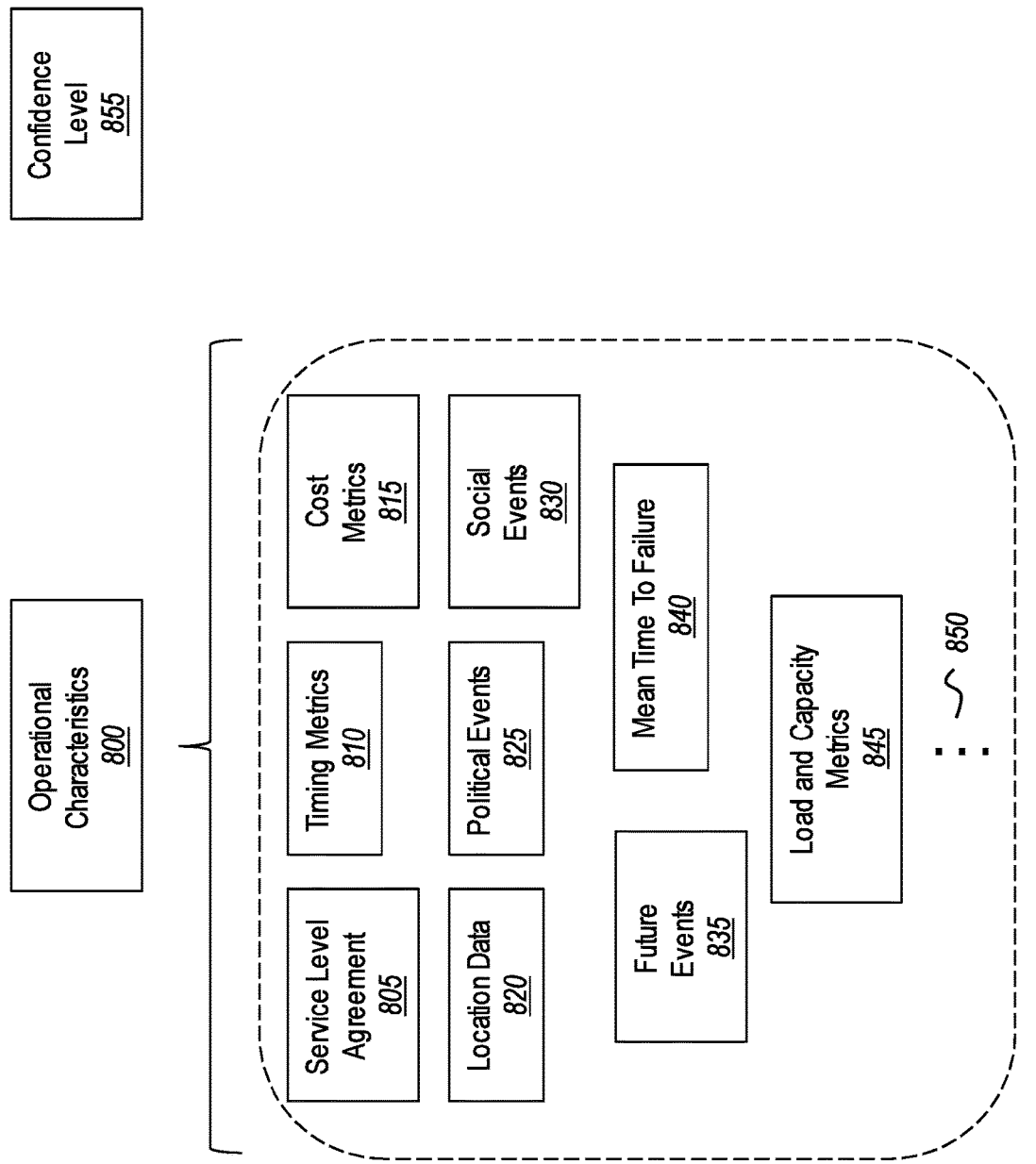
FIG. 8 illustrates some of the operational characteristics that the computer's machine learning is able to consider when deriving the learned characteristics of the power grid and when generating the prediction for the power grid's upcoming, anticipated load.

As described above, the computer system 600 is able to analyze any number of different operational characteristics associated with any number of power grids and/or any number of data centers when deriving the learned characteristics. FIG. 8 provides a list of some of the operational characteristics 800 that may be considered when learning and deriving the learned characteristics.

One characteristic is whether there is a service level agreement 805 in place between the data center and a client. A service level agreement (SLA) dictates what services the data center will provide to the client and how those services will be provided. As an example, a SLA may dictate that certain services are to be offered at all times of day and without any throttling effects. In contrast, the SLA may specify that the data center is to provide services only during certain times of day or even certain times of year. In this regard, a SLA may delineate any requirement or condition that exists between the client and the data center. The machine learning component 605 from FIG. 6 is able to parse or segment this SLA to learn the terms and conditions associated with it. Further, the machine learning component 605 is able to analyze any number of SLAs. These SLAs will impact how much power the data center consumes (e.g., if the data center is required to provide continuous services, then more power will be consumed). In this manner, the SLAs at least partially impact the power grid.

Another characteristic that is considered is timing metrics 810. These metrics may indicate the power levels of the power grid during certain times of day or even during certain times of the year. For example, the power grid may have a surplus of power during early morning times and may have a power shortage during peak business hours. Similarly, the power grid may have shortages during particularly hot or cold times of the year when many facilities are continuously operating their climate control systems. In this manner, the machine learning component 605 is able to monitor and analyze any fluctuations in the power grid's load during different times of a day or during different times of a year.

Another characteristic that is considered is the cost metrics 815. Electricity is typically not free. Furthermore, some power grids may have a variable cost for providing power. Another metric associated with cost is how much a power provider (e.g., a power station) may pay the data center to provide ancillary services when there is a shortage of electricity in the power grid. The machine learning component 605 is able to analyze when peak profit times (with regard to providing ancillary services) have previously occurred in an attempt to identify patterns to predict future instances.

Another characteristic is location data 820. The machine learning component 605 is able to analyze the geographic region to detect peculiarities or particular happenings that occur for a particular geographic region. This geographic data includes weather data, natural disaster data, climate changes, or any other geographic or environmental data that may weigh or otherwise influence how the power grid operates. In this manner the machine learning component 605 is able to analyze any type of past environmental condition that has occurred in geographic areas associated with the power grid.

Other characteristics include political events 825 (e.g., elections) and social events 830 (e.g., sporting activities). When large groups of people congregate, they will consume more electricity (e.g., businesses serving these large groups of people will consume more electricity). As such, these kinds of events effect the power grid as well.

The operational characteristics 800 may also include any future events 835 that are scheduled to occur in the power grid. For instance, future political and social events are typically scheduled well in advance. Other electricity-intensive events are also often scheduled well in advance. Therefore, not only are past and current operational characteristics considered when generating a prediction, but the future events 835 are also considered.

Another characteristic that is considered is the mean time to failure 840 for hardware components operating for or in the power grid. These components may be for the power grid itself (e.g., the power station, the cables, the transformers, etc.) or they may be for computing devices within the data center. The machine learning component 605 is able to analyze when components will likely fail and when they will need to be replaced. Similarly, the machine learning component 605 is able to analyze the load and capacity metrics 845 of the power grid and/or the data center.

The ellipsis 850 demonstrates that the machine learning component 605 is able to consider any number of different characteristics when analyzing the power grid to derive the learned characteristics. These operational characteristics are demonstrative of how the power grid performed in the past. By analyzing and learning about the past, current, and potential future behaviors of the power grid, the machine learning component 605 is able to generate an estimation or prediction regarding how the power grid will perform in the future. It should also be noted that the machine learning component 605 may learn from other power grids as well. As such, machine learning can be performed on any number of power grids. By compiling, synthesizing, and learning from the past operational characteristics, the machine learning component 605 will be able to better predict the future operations of the power grid.

Predictions are not always perfect, however, and sometimes unpredictable events occur that skew or otherwise tarnish the machine learning component 605's prediction. Therefore, it is beneficial to include a confidence level 855 for the resulting prediction. This confidence level 855 provides an indication of how sure (i.e. how confident) the machine learning component 605 is that the prediction will actually come to pass. Higher confidence levels suggest a higher likelihood that the prediction will occur while lower confidence levels suggest a lower likelihood. Once the prediction and confidence level 855 are developed, then they may be passed to the decision component 610 from FIG. 6. In some embodiments, the decision component 610 makes the final decision on how to proceed in light of the prediction and the confidence level 855.

Some embodiments also build in an "unpredictability buffer" into the confidence level 855 for one, some, or all of the predictions. As indicated above, predictions are not always perfect and neither are confidence levels. As such, some embodiments automatically factor in a predetermined buffer to one, some, or all confidence levels. As an example, the embodiments may add a selected percentage value (e.g., 5%, 10%, 15%, etc.) as an error margin into the confidence level 855. In some instances, the unpredictability buffer is the same for all confidence levels regardless of the determined type of the corresponding prediction (e.g., is the type of the prediction an environmental type, a hardware repair type, a social event type, etc.). In other instances, different types of predictions will have different built in unpredictability buffers. For example, one prediction type may have an unpredictability buffer of 2% while another prediction type may have an unpredictability buffer of 15%. As such, an initial confidence level may be adjusted to adjust for unpredictable circumstances.

Some embodiments also impose a threshold requirement on a confidence level before a prediction will be considered by the decision component 610. For example, in some embodiments, only predictions that satisfy the pre-established threshold requirement will be passed to the decision component 610. If the machine learning component 605 is not sufficiently sure that a prediction will come to pass (as evidenced by the confidence level), then it may not be worthwhile to cause the decision component 610 to consider the prediction. Some examples will be helpful.

Suppose, in a first example, that the machine learning component 605 analyzed the power grid's performance (past, present, or future) and determined that there is a 95% probability that a major electricity consumer will stop consuming electricity at a particular time, thus causing a surplus of electricity in the power grid at that time. Further suppose that the threshold requirement is set so that any prediction with a confidence level over 85% will be considered by the decision component 610. Because 95% is higher than the threshold requirement, this prediction will be considered by the decision component 610.

Now suppose, in a second example, that the machine learning component 605 analyzed the power grid and determined that there is a 5% probability that a natural disaster will occur at a particular time, thus causing major disruptions to the power grid. Because 5% is lower than the threshold requirement, this prediction will not be passed to the decision component 610 for consideration. As such, the embodiments may impose a threshold requirement before a prediction will be considered. It will be appreciated that the embodiments are able to generate any number of predictions at a time.

Further, multiple predictions may be aggregated together to form an overall prediction regarding an upcoming, anticipated load on the power grid. As such, the embodiments may consider individual predictions, but they may also bundle a group of predictions together. When multiple predictions are grouped together, the embodiments may generate an overall confidence level by aggregating the individualized confidence levels. This aggregation may occur in any manner. For instance, when aggregating the confidence levels, the levels may simply be averaged together. Alternatively, the embodiments may weight some predictions more heavily than others based on the type of prediction (e.g., is the prediction related to environmental events or is the prediction related to scheduled hardware repair events). Therefore, some confidence levels may be weighted more heavily than other confidence levels. Any other method for aggregating confidence levels may be used as well.

Decision Tree

Figure 9:
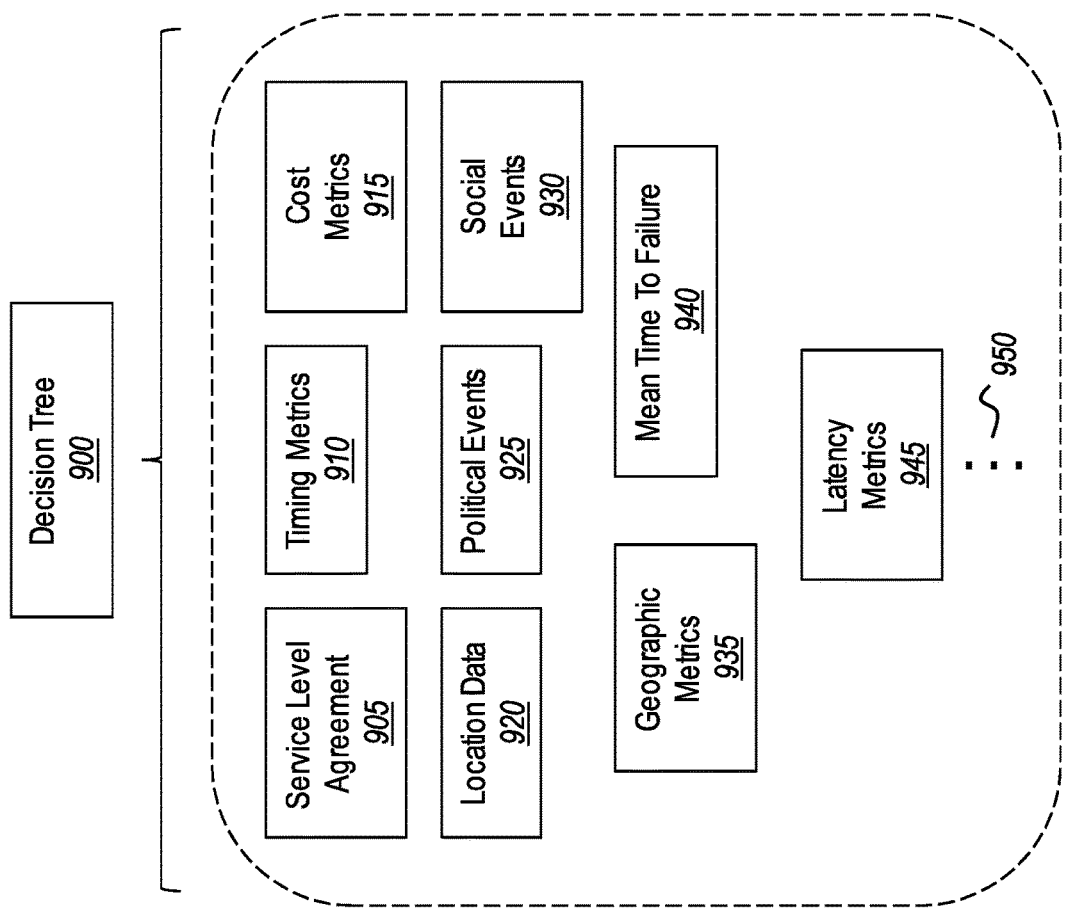
FIG. 9 shows some of the factors that may be considered when deciding whether to actually proceed with performing a mitigation operation in response to the prediction.

Attention will now be directed to FIG. 9 which shows some of the factors that may be considered when determining how to proceed in response to a prediction. After analyzing the past, current, and/or future operational characteristics of the power grid and/or the data center, the embodiments generate a decision tree 900 to determine whether a particular action should be pursued in response to the prediction. Some of the factors that are included within the decision tree 900 were also described in relation to FIG. 8. For instance, the decision tree 900 may consider a service level agreement 905, timing metrics 910, cost metrics 915, location data 920, political events 925, social events 930, and geographic metrics 935 (e.g., weather, climate, likelihood of natural disasters, etc.), and mean time to failure 940. In addition to influencing the prediction regarding the anticipated load on the power, these factors may also influence the decision on how to proceed in light of the prediction.

Another characteristic includes latency metrics 945. There is often a certain amount of latency involved when one data center communicates with another data center to pass services and data back and forth. Because fluctuations in the power grid occur very fast (e.g., within a few milliseconds), it may be beneficial to begin preparing for those fluctuations well in advance to provide the data center adequate time to transfer its services and data to another data center. These preparations will consider the latency metrics 945. Furthermore, if some services and data will take minutes, hours, or perhaps even days to transfer, then it may not be worthwhile to perform that transfer if the costs outweigh the benefits. As such, the embodiments use the decision tree 900 to weigh the costs versus the benefits (as well as any other constraints) to determine how best to respond to the fluctuations in the power grid. The ellipsis 950 demonstrates that more or fewer factors may also be consider when determining how to proceed in light of a prediction.

An example will be helpful. Suppose the prediction indicated that a major social event is going to occur shortly and that this social event will put a heavy load on the power grid. Because of this heavy load, the data center could achieve high profits by shutting down its operations to provide ancillary services to the power grid. Notwithstanding the potential for these high profits, the embodiments will also consider other factors, as shown by the decision tree 900. For instance, suppose that a certain SLA mandates that the data center be fully operational during the same time as the social event. Such a requirement limits the data center's ability to provide ancillary services. Therefore, although high profits could be achieved, the SLA may be a more controlling factor and thus the data center will continue its operations regardless of the social event. In this manner, the embodiments are able to compare, contrast, weigh, and consider any number of different factors when determining how best to proceed in light of a prediction (or a group of bundled predictions).

Mitigation Operations

Up to this point, the disclosure focused on how predictions were generated. Then, the disclosure focused on what factors may be considered when deciding how to proceed in light of that prediction. Now, the disclosure will focus on some of the actions that can be performed based on the decision to act. Accordingly, attention will now be directed to FIG. 10 which illustrates some of the mitigation operations 1000 that may be performed in response to the prediction and to the decision to act.

As shown, the mitigation operations 1000 include a wide array of different operations. As a first operation, the control component 615 from FIG. 6 may cause the data center to consume more power 1005. This may be achieved by turning on additional resources, by increasing the power to resources, or any other process that consumes power. As an example, the control component 615 may cause more power to be consumed by increasing a load for an air-handler of the data center or even by increasing the cooling or heating performed by the HVAC. As another example, the data center is able to increase the amount of service processing than it normally performs (e.g., by running at high capacity) in order to consume more power. Consuming more power may be beneficial in circumstances where there is a surplus of power in the power grid (e.g., violent winds caused a wind turbine to produce more electricity). As such, the data center is able to consume any amount of additional power to help balance the power grid.

In some embodiments, determining how much more power to consume is based, at least partially, on a determined mean time to failure associated with one or more hardware devices of the data center. For instance, it is probably not worthwhile to consume more power if it means that the hardware will quickly begin to fail. Accordingly, the embodiments intelligently determine how best to consume more power when consuming more power is the selected mitigation operation.

Another operation is to store more power 1010. As discussed earlier, the data center includes electricity storing mechanisms (e.g., capacitors, batteries, fuel cells, etc.). When there is an excess amount of electricity, then the data center may store that electricity in any known manner.

Another operation is to reduce power usage 1015. When there is a shortage of electricity in the power grid, then the control component 615 may elect/decide to reduce the amount of electricity pulled from the power grid and rely more heavily on the data center's own, internal power sources. This may be achieved by restricting the amount of processing the data center performs or even by restricting access to the data center so that the data center is not available to perform certain operations.

On a related note, when there is a shortage of electricity in the power grid, the data center is able to sell off, or rather offload its own generated power 1020 by providing ancillary services to the power grid. In this manner, the data center acts as a mini power station for the power grid and augments the electricity provided by a major power station with its own electricity. Of course, the embodiments intelligently decide how best to achieve these operations by weighing the costs and the benefits as well as any other controlling factors, as described earlier.

Another operation is to migrate services 1025 and/or migrate data 1030 to another data center (that is on a different power grid) in an effort to reduce the amount of electricity that the data center is consuming. This operation may be performed when there is a shortage of electricity in the power grid, and it is desirable to provide ancillary services to the power grid in order to increase profits for the data center. By migrating services and/or data, fewer computing resources will be used after the migration occurs, and the data center will then be able to provide a larger amount of electricity to the power grid, thereby increasing profits gained by providing ancillary services. In some embodiments, determining which data to migrate and how to migrate that data may be based on any SLAs that exist between the data center and its users.

Figure 10:
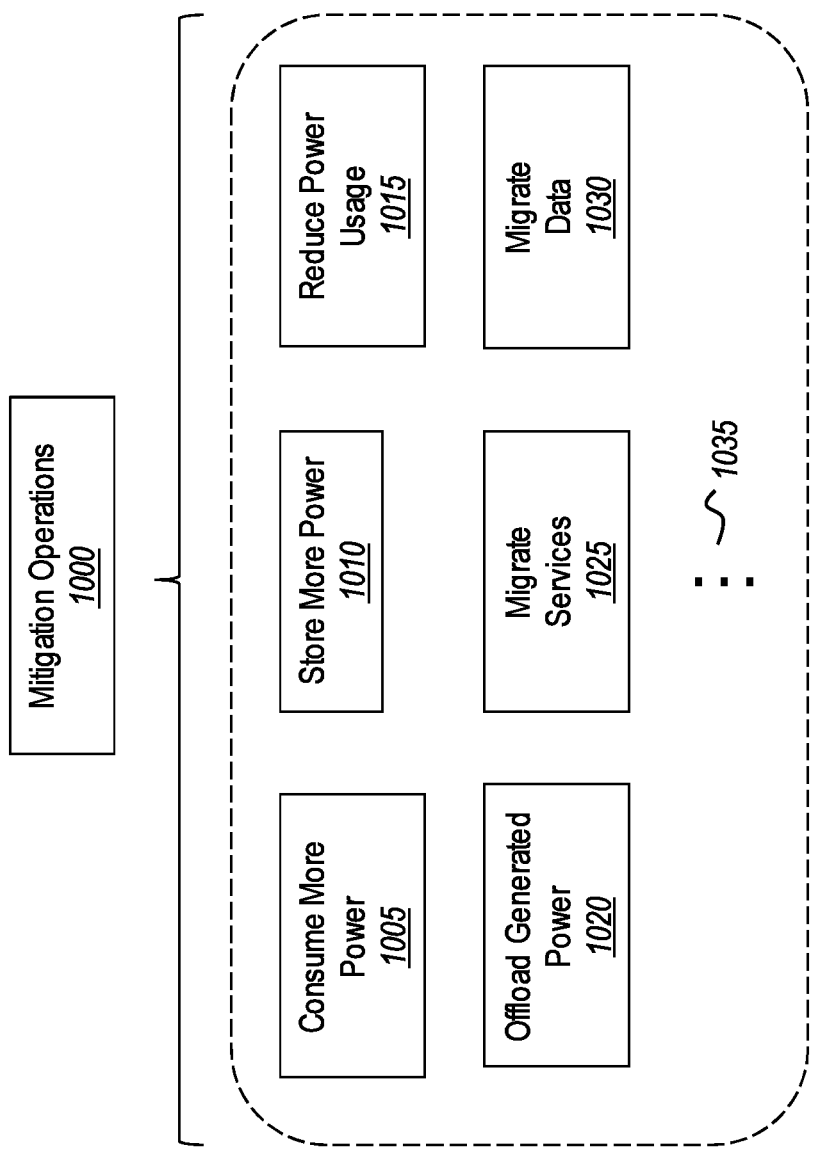
FIG. 10 demonstrates some of the mitigation operations that may be performed to help balance the power grid in response to the decision to actually perform one or more actions in response to the prediction regarding the power grid's upcoming, anticipated load.

The ellipsis 1035 demonstrates that other mitigation operations are also available and that the operations in FIG. 10 are non-limiting. It should be noted that these operations may be performed in response to the machine learning that occurred earlier and which was performed in order to predict upcoming loads on the power grid. By making these predictions, data centers are better able to schedule how their resources will be used.

Furthermore, it will be appreciated that different combinations of these operations may be performed at the same time or in sequence. For example, suppose a prediction indicated that the data center will be able to achieve high profits by providing ancillary services at a certain future point in time. In response, the embodiments may initially consume more electricity (e.g., when availability is high and when prices are low) from the power grid by storing that electricity in batteries, capacitors, fuel cells, or any other charge storing device. The data center can also begin to migrate services and data to another data center so as to reduce the amount of electricity it will consume during the peak period. Once the peak period for providing ancillary services arrives, then the data center may begin to offer electricity back to the power grid via the electricity it previously stored as well as any electricity it can generate using its own power sources. In this manner, the data center is able to sell back electricity during peak times to command a high profit. When the peak period ends, then the data center can resume its normal operations and re-acquire the services and data it previously offloaded. In this regard, any combination of the above mitigation operations may be performed in parallel or in sequence.

Accordingly, the disclosed embodiments optimize resources in a cloud computing environment (e.g., a data center). By dynamically moving data and services around to different data centers in different geographic regions, the embodiments are able to capitalize on ancillary services as well as to help balance the power grid during times of surplus or times of need. By deriving learned characteristics of the power grid and the data center, the embodiments are able to shift resources while still maintaining a desired level of reliability, assurance, and/or availability to clients. Furthermore, deciding which mitigation operations to perform is based, at least partially, on the power generation abilities, the power storage abilities, and/or the power consumption abilities of the data center. It will be appreciated that the embodiments are able to make predictions and respond to those predictions very quickly (e.g., within a threshold number of milliseconds after the prediction is generated). Further, the embodiments are able to perform mitigation operations within a threshold number of milliseconds in response to a predicted power grid fluctuation. In this manner, the embodiments provide a robust and reliable mechanism for responding to the fluctuations that occur in a power grid in order to help balance the power grid, to help schedule the operations of the data center, and to facilitate in providing ancillary services to the power grid.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are structured to be executable by the one or more processors to thereby cause the computer system to:
   analyze one or more past operational characteristics for a power grid within which the computer system operates to derive one or more learned characteristics for the power grid, the computer system being associated with one or more power sources that are structured to provide power to the computer system independently of the power grid;
   identify one or more possible future operational characteristics for the power grid;
   use the one or more learned characteristics and the one or more identified future operational characteristics to generate a prediction regarding a future load event associated with the power grid, the prediction including a buffer selected to compensate for at least some unpredictability associated with the future load of the power grid; and
   in response to the prediction, perform one or more operations using the one or more power sources at the computer system to reduce fluctuating supply voltage peaks that occur on the power grid during the future load event.

2. The computer system of claim 1, wherein the future load event comprises at least one of a future social event, a future political event, a future weather event, a future climate event, a future hardware failure event, or a future hardware replacement event.

3. The computer system of claim 1, wherein the one or more operations includes at least one of offering electricity stored by the one or more power sources to the power grid, or offering electricity generated by the one or more power sources to the power grid.

4. The computer system of claim 1, further comprising, in response to the prediction, causing the computer system to consume more power, and wherein determining how much more power to consume is based, at least partially, on a determined mean time to failure associated with one or more hardware devices of the computer system.

5. The computer system of claim 1, wherein the one or more operations includes causing the one or more power sources to store power.

6. The computer system of claim 1, further comprising, in response to the prediction, migrating one or more services from the computer system to a different computer system, and wherein the different computer system uses a different power grid.

7. The computer system of claim 1, wherein performing the one or more operations is based, at least partially, on a service level agreement.

8. The computer system of claim 1, wherein deriving the one or more learned characteristics for the power grid includes analyzing past environmental conditions that have occurred in a geographic area associated with the power grid.

9. The computer system of claim 1, wherein the one or more learned characteristics include information corresponding to a load of the power grid, and wherein the information includes one or more of timing metrics for the power grid, cost metrics for the power grid, location data for the power grid, past political events that have impacted the power grid, or past social events that have impacted the power grid.

10. The computer system of claim 1, wherein generating the prediction regarding the future load event on the power grid includes generating a level of confidence associated with the prediction, the level of confidence indicating an estimated likelihood that the future load event will actually occur.

11. The computer system of claim 1, wherein the one or more operations are based, at least partially, on a power generation ability of the one or more power sources, a power storage ability of the one or more power sources, or a power consumption ability of the computer system.

12. The computer system of claim 1, wherein analyzing the one or more past operational characteristics for the power grid includes monitoring fluctuations in a load of the power grid during different times of a day or during different times of a year.

13. The computer system of claim 1, wherein analyzing the one or more past operational characteristics for the power grid includes analyzing at least one of weather data or climate data for a geographic region serviced by the power grid.

14. The computer system of claim 1, wherein deriving the one or more learned characteristics is performed using a neural network, and wherein analyzing the one or more past operational characteristics is performed by the neural network.

15. The computer system of claim 1, wherein the one or more operations are performed after generating a decision tree that takes as input (1) the prediction and (2) a latency between the computer system and at least one other computer system.

16. A method, implemented at a computer system that includes one or more processors, the method comprising:
- analyzing one or more past operational characteristics for a power grid within which the computer system operates to derive one or more learned characteristics for the power grid, the computer system being associated with one or more power sources that are structured to provide power to the computer system independently of the power grid;
- identifying one or more possible future operational characteristics for the power grid;
- using the one or more learned characteristics and the one or more identified future operational characteristics to generate a prediction regarding a future load event associated with the power grid, the prediction including a buffer selected to compensate for at least some unpredictability associated with the future load of the power grid; and
- in response to the prediction, performing one or more operations using the one or more power sources at the computer system to reduce fluctuating supply voltage peaks that occur on the power grid during the future load event.

17. The method of claim 16, wherein the future load event comprises at least one of a future social event, a future political event, a future weather event, a future climate event, a future hardware failure event, or a future hardware replacement event.

18. The method of claim 16, wherein the one or more operations includes at least one of causing the one or more power sources to store power, offering electricity stored by the one or more power sources to the power grid, or offering electricity generated by the one or more power sources to the power grid.

19. A computer program product comprising one or more hardware storage devices having stored thereon computer-executable instructions that are structured to be executable by one or more processors to thereby cause a computer system to:
- analyze one or more past operational characteristics for a power grid within which the computer system operates to derive one or more learned characteristics for the power grid, the computer system being associated with one or more power sources that are structured to provide power to the computer system independently of the power grid;
- identify one or more possible future operational characteristics for the power grid;
- use the one or more learned characteristics and the one or more identified future operational characteristics to generate a prediction regarding a future load event associated with the power grid, the prediction including a buffer selected to compensate for at least some unpredictability associated with the future load of the power grid; and
- in response to the prediction, perform one or more operations using the one or more power sources at the computer system to reduce fluctuating supply voltage peaks that occur on the power grid during the future load event.

\* \* \* \* \*